United States Patent
Maity et al.

(10) Patent No.: US 11,652,877 B2
(45) Date of Patent: May 16, 2023

(54) METHOD AND SYSTEM FOR ESTABLISHING TRUST BETWEEN NODES IN A NETWORK BASED ON RECOMMENDATIONS

(71) Applicant: EMC IP Holding Company LLC, Hopkinton, MA (US)

(72) Inventors: Soumya Maity, Bengaluru (IN); Sathish Kumar Bikumala, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/238,653

(22) Filed: Apr. 23, 2021

(65) Prior Publication Data
US 2022/0345523 A1 Oct. 27, 2022

(51) Int. Cl.
*H04L 67/1061* (2022.01)
*H04L 67/104* (2022.01)
*H04L 67/51* (2022.01)

(52) U.S. Cl.
CPC ...... *H04L 67/1068* (2013.01); *H04L 67/1057* (2013.01); *H04L 67/1059* (2013.01); *H04L 67/1065* (2013.01); *H04L 67/51* (2022.05)

(58) Field of Classification Search
CPC ............. H04L 67/1057; H04L 67/1059; H04L 67/1065; H04L 67/1068; H04L 67/16; H04L 67/10
USPC ........................................................ 709/223
See application file for complete search history.

(56) References Cited

U.S. PATENT DOCUMENTS

| | | | |
|---|---|---|---|
| 9,077,580 B1* | 7/2015 | Randhawa | H04L 67/1023 |
| 2007/0226374 A1* | 9/2007 | Quarterman | G06Q 30/02 |
| | | | 709/250 |
| 2011/0029672 A1* | 2/2011 | Agneeswaran | G06F 9/5044 |
| | | | 709/226 |
| 2011/0306364 A1* | 12/2011 | Gossain | H04L 12/5692 |
| | | | 455/456.6 |
| 2013/0117329 A1* | 5/2013 | Bank | G06F 16/954 |
| | | | 707/803 |

(Continued)

OTHER PUBLICATIONS

K. Indira, A novel framework for cloud service recommendation, Sep. 1, 2017, IEEE, https://ieeexplore.ieee.org/document/8392159?source=IQplus (Year: 2017).*

*Primary Examiner* — Zi Ye
(74) *Attorney, Agent, or Firm* — Chamberlain, Hrdlicka, White, Williams & Aughtry

(57) ABSTRACT

Techniques described herein relate to a method for managing nodes. The method may include sending, by a first node of nodes, a node information request to a social manager, where the node information request specifies a portion of a service to be provided to the first node; obtaining node information associated with a portion of the nodes from the social manager, where the portion of the plurality of nodes previously expressed node capability information and node configuration information associated with the portion of the service; identifying a second node of the portion of the nodes based on the node information to perform the portion of the service; and performing the service using the second node, where the second node performs the portion of the service.

14 Claims, 9 Drawing Sheets

(56) References Cited

U.S. PATENT DOCUMENTS

2016/0036893 A1* 2/2016 Pomerantz .............. H04L 67/10
709/201
2016/0180414 A1* 6/2016 Willard .............. G06Q 30/0282
705/347

* cited by examiner

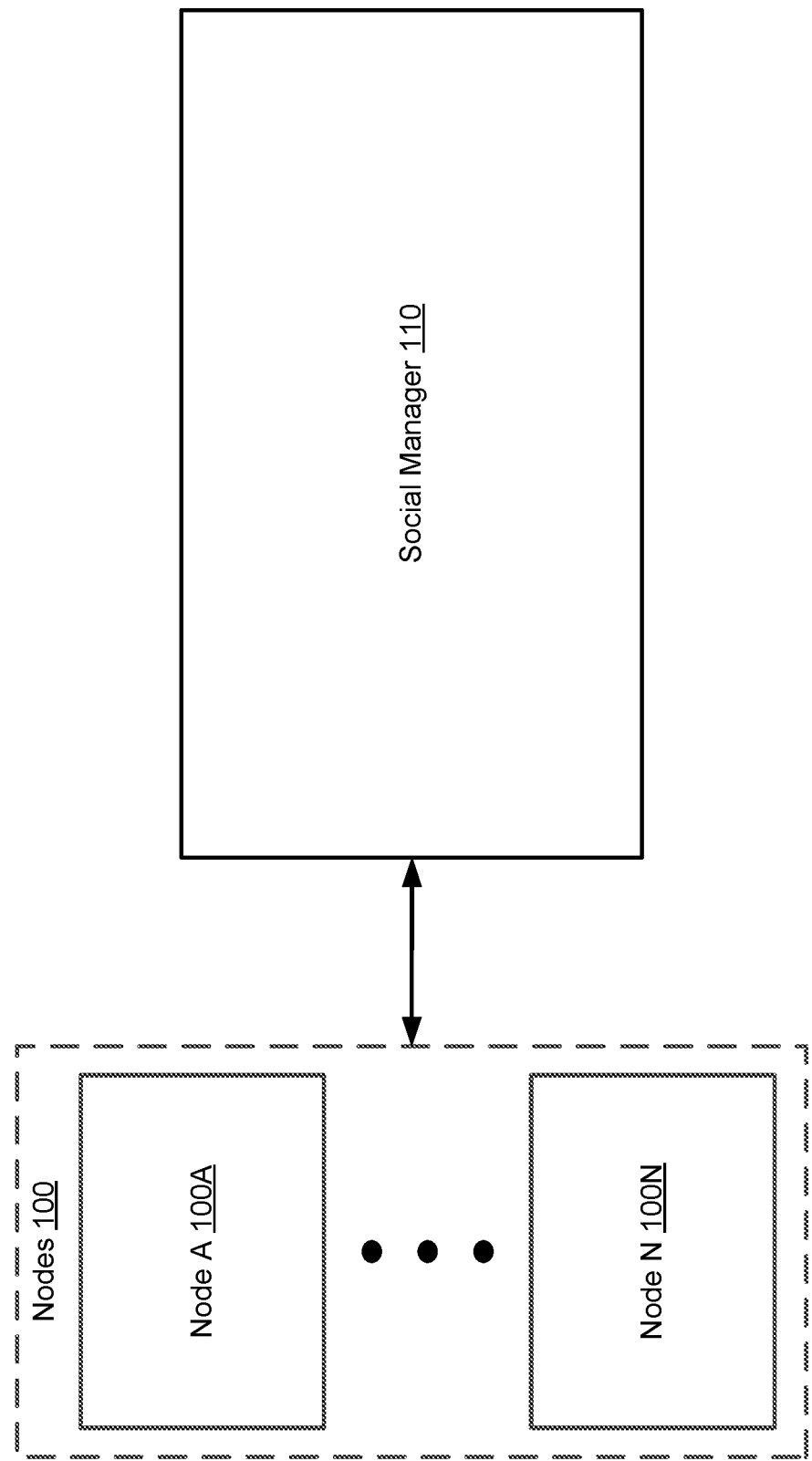

METHOD AND SYSTEM FOR ESTABLISHING TRUST BETWEEN NODES IN A NETWORK BASED ON RECOMMENDATIONS

BACKGROUND

Computing devices may provide services. To provide the services, the computing devices may include hardware components and software components. Computing devices may provide and obtain services from other computing devices.

SUMMARY

In general, certain embodiments described herein relate to a method for managing nodes. The method may include sending, by a first node of nodes, a node information request to a social manager, where the node information request specifies a portion of a service to be provided to the first node; obtaining node information associated with a portion of the nodes from the social manager, where the portion of the plurality of nodes previously expressed node capability information and node configuration information associated with the portion of the service; identifying a second node of the portion of the nodes based on the node information to perform the portion of the service; and performing the service using the second node, where the second node performs the portion of the service.

In general, certain embodiments described herein relate to a system for managing nodes. The system may include a social manager and a first data node that is programmed to send, by a first node of nodes, a node information request to a social manager, where the node information request specifies a portion of a service to be provided to the first node; obtain node information associated with a portion of the nodes from the social manager, where the portion of the plurality of nodes previously expressed node capability information and node configuration information associated with the portion of the service; identify a second node of the portion of the nodes based on the node information to perform the portion of the service; and perform the service using the second node, where the second node performs the portion of the service.

In general, certain embodiments described herein relate to a non-transitory computer readable medium that includes computer readable program code, which when executed by a computer processor enables the computer processor to perform a method for managing nodes. The method may include sending, by a first node of nodes, a node information request to a social manager, where the node information request specifies a portion of a service to be provided to the first node; obtaining node information associated with a portion of the nodes from the social manager, where the portion of the plurality of nodes previously expressed node capability information and node configuration information associated with the portion of the service; identifying a second node of the portion of the nodes based on the node information to perform the portion of the service; and performing the service using the second node, where the second node performs the portion of the service.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
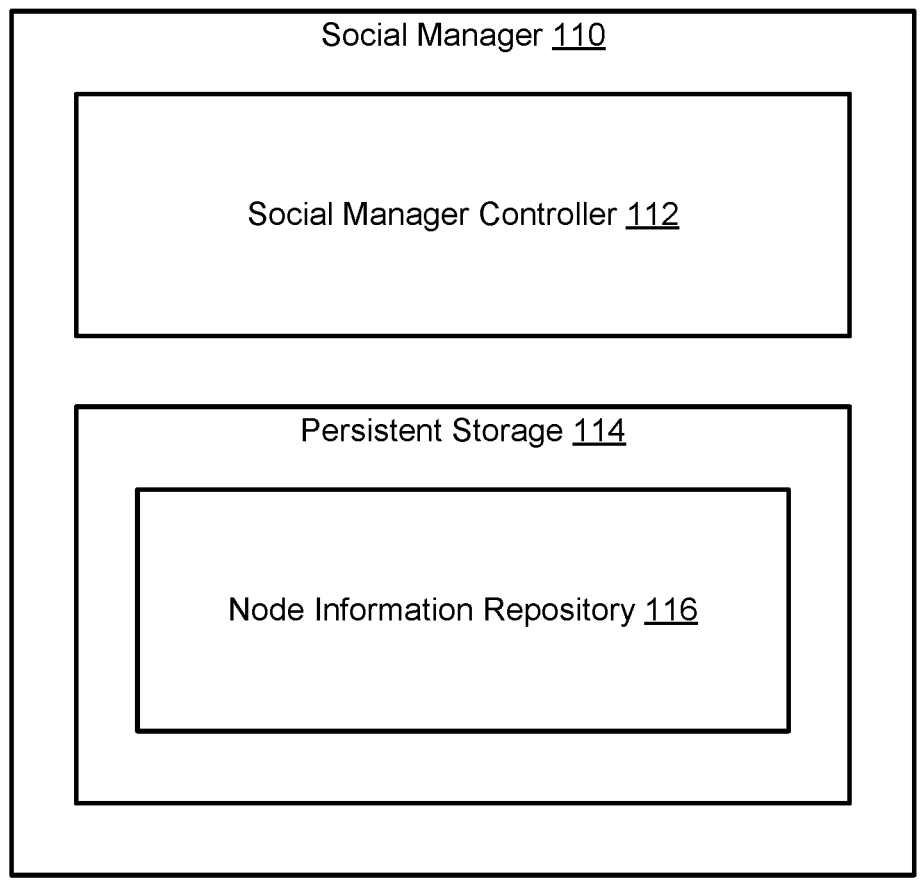
FIG. 1B shows a diagram of a social manager in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to establishing trust between nodes based on node information maintained by a social manager. A node may require another node to perform a service. A node may obtain node information associated with multiple nodes that include the capability to perform the service. The node may identify the most trustworthy node to perform the service based on node ratings, node endorsements, and node review information generated by other nodes that have previously obtained services from the multiple nodes that include the capability to perform the service. The node may identify the node of the multiple nodes associated with the highest node rating, the most node endorsements, and the node review information that indicates the most successfully performed services. As a result the node may use the node information automatically generated by other nodes to identify the most trustworthy node to perform the service. Therefore, the efficiency of determining the trustworthiness of other nodes and reliability of selecting the most trustworthy nodes in a system may be improved.

FIG. 1A shows a diagram of a system in accordance with one or more embodiments of the invention. The system may include nodes (100) and a social manager (110). The system may include additional, fewer, and/or different components without departing from the invention. Each component may be operably connected to any of the other components via any combination of wired and/or wireless connections. Each of the aforementioned components is discussed below.

In one or more embodiments of the invention, the nodes (100) include the functionality to perform services for users of the nodes. The services may include any type of computer implemented services without departing from the invention. The services and/or portions of services may include, for example, generating inferences, training for machine learning, implementing in-memory databases, having a particular dataset (e.g., video and images from stores of a certain company in a certain region of the country), performing classification, data analysis, etc. The nodes (100) may include any quantity of nodes without departing from the invention. The nodes may include node A (100A) and node N (100N). Each node of the nodes (100) may perform similar and/or different services. A service of the services may include one or more portions of the service. A single node (e.g., 100A) may not include the functionality to perform all portions of the service, and therefore, may use other nodes (e.g., 100N) to perform the portions of the service that the single node (e.g., 100A) is unable to perform.

To perform services using other nodes, the nodes (100) may include the functionality to communicate with other nodes to transmit requests to perform service portions and/or data associated with service portions between the nodes (100). To identify other nodes to perform portions of services, the nodes may obtain social management services from the social manager (110). To obtain social management services, the nodes (100) may include the functionality to share node information (discussed below) with the service manager (110) and to obtain node information from the social manager (110) (e.g., through any number of application programming interface (API) calls associated with the social manager). The nodes (100) may include the functionality to perform and/or obtain other and/or additional services without departing from the invention. For additional information regarding the nodes (100), refer to FIG. 1C.

Figure 5:
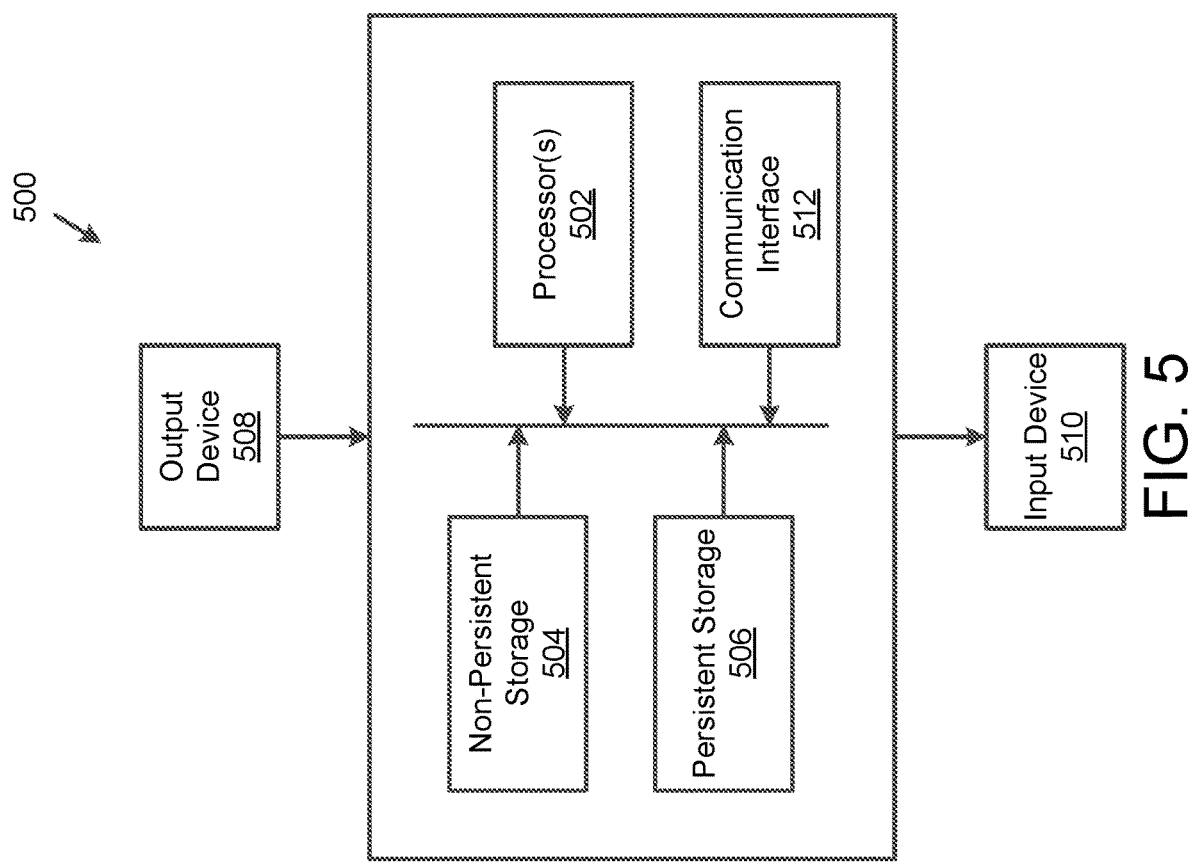
FIG. 5 shows a diagram of a computing device in accordance with one or more embodiments of the invention.

In one or more embodiments of the invention, the nodes (100) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the nodes (100) described throughout this application.

In one or more embodiments of the invention, the nodes (100) are implemented as a logical device. The logical device may utilize the computing resources of any number of computing devices and thereby provide the functionality of the nodes (100) described throughout this application.

In one or more embodiments of the invention, the social manager (110) includes the functionality to provide social management services to the nodes (100). The social management services may include (i) registering nodes (100) using node information associated with the nodes, (ii) providing unique identities for the nodes (100) and authenticating identities of nodes (100) (e.g., using public-key infrastructure (PKI) or any other means of authentication without departing from the invention), (iii) maintaining a node information repository (discussed below), and (iv) providing node information to requesting nodes (100). The social management services may include other and/or additional services without departing from the invention. The social manager (110) may include the functionality to perform and or obtain other and/or additional services without departing from the invention. For additional information regarding the social manager (110), refer to FIG. 1B.

In one or more embodiments of the invention, the social manager (110) is implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the social manager (110) described throughout this application.

In one or more embodiments of the invention, the social manager (110) are implemented as a logical device. The logical device may utilize the computing resources of any number of computing devices and thereby provide the functionality of the social manager (110) described throughout this application.

FIG. 1B shows a diagram of a social manager in accordance with one or more embodiments of the invention. The social manager (110) may be an embodiment of the social manager (110, FIG. 1A) discussed above. As discussed above, the social manager (110) may provide social management services to the nodes (100, FIG. 1A). To provide the aforementioned functionality, the social manager (110) may include a social manager controller (112) and persistent storage (114). The social manager (110) may include additional, fewer, and/or different components without departing from the invention. Each of the aforementioned components is discussed below.

In one or more embodiments of the invention, the social manager controller (112) includes the functionality of performing registration services and node information repository management services of the social management services provided by the social manager (110). The registration services may include (i) obtaining registration requests from nodes (100, FIG. 1A), (ii) obtaining node information associated with nodes (100, FIG. 1A) specified by registration requests, (iii) updating the node information repository (116) using the obtained node information, and (iv) sending registration confirmation to the nodes (100, FIG. 1A). The registration services may include other and/or additional services without departing from the invention. The node information repository management services may include (i) obtaining node information requests from nodes (100, FIG. 1A), (ii) identifying node information included in the node information repository (116) associated with the node information requests, (iii) providing the identified node information to the nodes (100, FIG. 1A), (iv) obtaining updated node information from nodes (100, FIG. 1A), and (v) updating the node information repository (116) based on the updated node information. The node information repository management services may include other and/or additional services without departing from the invention. The social manager controller may include the functionality to perform all, or a portion of, the methods illustrated in FIGS. 3A-3B. The social manager controller (112) may include the functionality to perform other and/or additional services without departing from the invention.

In one or more embodiments of the invention, the social manager controller (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the social manager controller (112) described throughout this application.

In one or more embodiments of the invention, the social manager controller (112) is implemented as computer instructions, e.g., computer code, stored on a persistent storage that when executed by a processor of the social manager (110) causes the social manager (110) to provide the functionality of the social manager controller (112) described throughout this application.

In one or more embodiments of the invention, the persistent storage (114) stores data. The persistent storage (114) may include a node information repository (116). The persistent storage (114) may store other and/or additional data without departing from the invention. The node information repository (116) is discussed below.

The node information repository (116) may be one or more data structures that include information regarding the registered nodes (100, FIG. 1A) of the system illustrated in FIG. 1A. The information included in the node information repository (116) may be used by the social manager controller (112) to identify nodes that include the resources and capabilities to perform services and/or portions of services. The information included in the node information repository (116) may be used by the nodes (100, FIG. 1A) to identify other nodes (100, FIG. 1A) to perform services and/or portions of services. A first portion of the information included in the node information repository (116) (i.e., initial node information) may be generated by the nodes (100, FIG. 1A) associated with the node information during registration. A second portion of the information included in the node information repository may be generated by nodes not associated with the nodes with which the generated node information is associated based on the performance of services and/or portions of services by the nodes (100, FIG. 1A). The node information repository (116) may include other and/or additional information without departing from the invention. For additional information regarding the node information repository (116), refer to FIG. 2.

The persistent storage (114) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (114) may utilize portions of any combination of hard disk drives, solid state disk drives, tape drives, and/or any other physical storage medium of any number of computing devices.

Figure 1C:
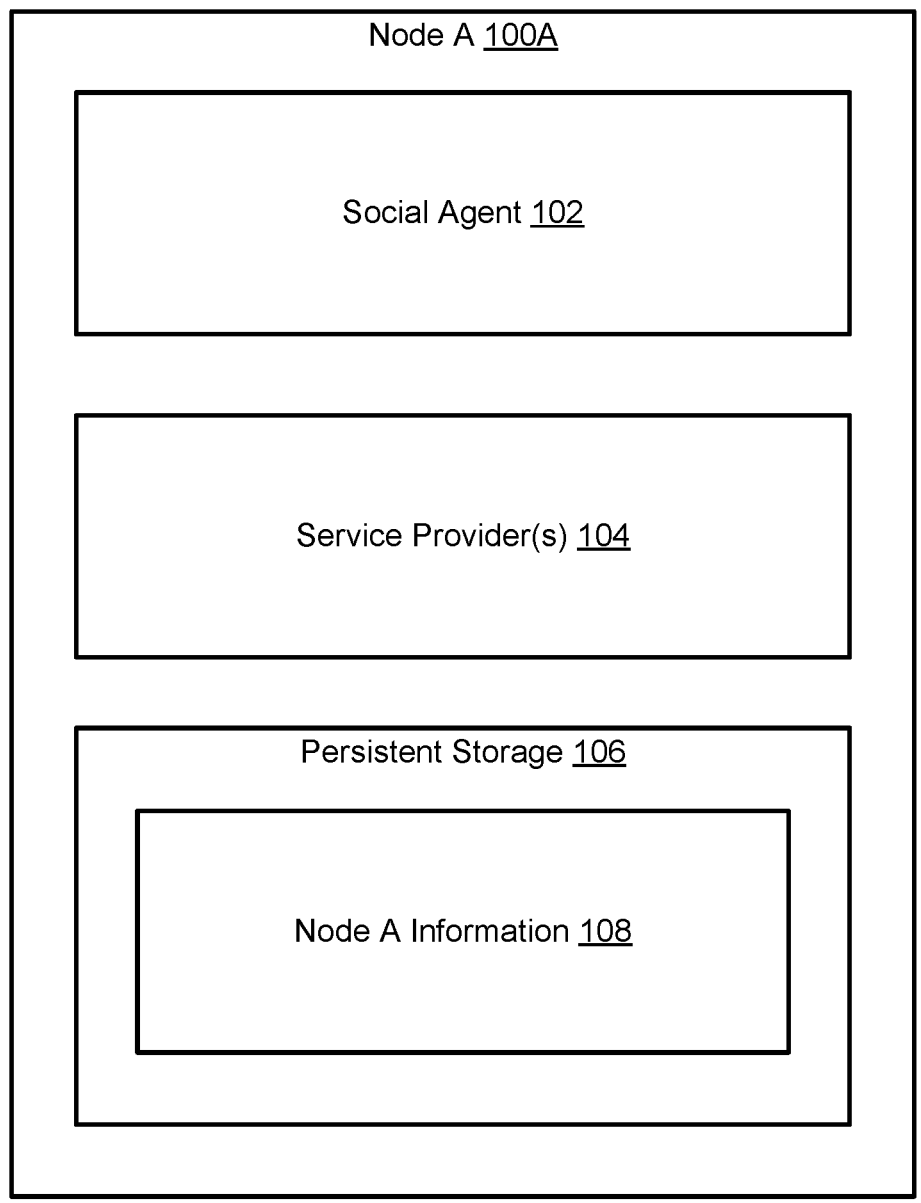
FIG. 1C shows a diagram of a node in accordance with one or more embodiments of the invention.

FIG. 1C shows a diagram of a node in accordance with one or more embodiments of the invention. Node A (100A) may be an embodiment of a node (e.g., 100A, FIG. 1A) of the nodes (100, FIG. 1A) discussed above. As discussed above, node A (100A) may provide computer implemented services to users of node A (100A) and obtain social management services from the social manager (110, FIG. 1A). To provide the aforementioned functionality, the social manager (110) may include a social agent (102), a service provider(s) (104), and persistent storage (106). Node A (100A) may include additional, fewer, and/or different components without departing from the invention. Each of the aforementioned components is discussed below.

In one or more embodiments of the invention, the social agent (102) includes the functionality to register with social manager (110). Registering may include sending a registration request and initial node information to the social manager (110, FIG. 1A). The social agent (102) may include the functionality to generate initial node information and/or obtain the initial node information from the service provider(s) and/or users of node A (100A) without departing from the invention. The social agent (102) may further include the functionality to obtain requests to perform services and/or portions of services and data associated with the requests from other nodes (e.g., 100N, FIG. 1A). The social agent (102) may further include the functionality to initiate the performance of services and/or portions of services by the service provider(s) (104). The social agent (102) may further include the functionality to provide the results of performances of services (e.g., data) to other nodes (e.g., 100N, FIG. 1A). The social agent (102) may further include the functionality to send requests to perform services and/or portions of services and data associated with the requests to other nodes (e.g., 100N, FIG. 1A). The social agent (102) may further include the functionality to obtain the results of performances of services (e.g., data) from other nodes (e.g., 100N, FIG. 1A).

The social agent (102) may include the functionality to generate node information associated with other nodes (e.g., 100N, FIG. 1A) based on the performances of the services and/or portions of services obtained from the other nodes (e.g., 100N, FIG. 1A). The social agent (102) may include the functionality to provide the node information associated with other nodes to the social manager (110) and to obtain node information from the social manager (110). The social agent (102) may further include the functionality to identify other nodes (e.g., 100N, FIG. 1A) to perform services and/or other services based on node information obtained from the social manager (110) FIG. 1A. The social agent (102) may include the functionality to perform all, or a portion of, the methods of FIGS. 3A-3B. The social agent (102) may include other and/or additional functionalities without departing from the invention.

In one or more embodiments of the invention, the social agent (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the social agent (102) described throughout this application.

In one or more embodiments of the invention, the social agent (102) is implemented as computer instructions, e.g., computer code, stored on a persistent storage that when executed by a processor of node A (100A) causes node A (100A) to provide the functionality of the social agent (102) described throughout this application.

In one or more embodiments of the invention, the service provider(s) (104) includes the functionality to perform services and/or portions of services for node A (100A) and/or other nodes (e.g., 100N, FIG. 1A). The service provider(s) (104) may perform any quantity of services and/or portions of services without departing from the invention. To perform the services and/or portions of the services, the service provider(s) may include any quantity of devices capable of electronically processing instructions and may include any number of components, which may include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof. The service provider(s) (104) may include other and/or additional types of components capable of performing services and/or portions of services without departing from the invention.

In one or more embodiments of the invention, the persistent storage (106) stores data. The persistent storage (106) may include node A information (108). The persistent storage (106) may store other and/or additional data without departing from the invention. The node A information (108) is discussed below.

The node A information (108) may be one or more data structures that include initial node information associated with node A (100A). The information included in the node A information (108) may be an embodiment of the information included in the node information repository associated with node A (100A). For additional information regarding the node A information (108), refer to FIG. 2.

The persistent storage (106) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (106) may utilize portions of any combination of hard disk drives, solid state disk drives, tape drives, and/or any other physical storage medium of any number of computing devices.

Figure 2:
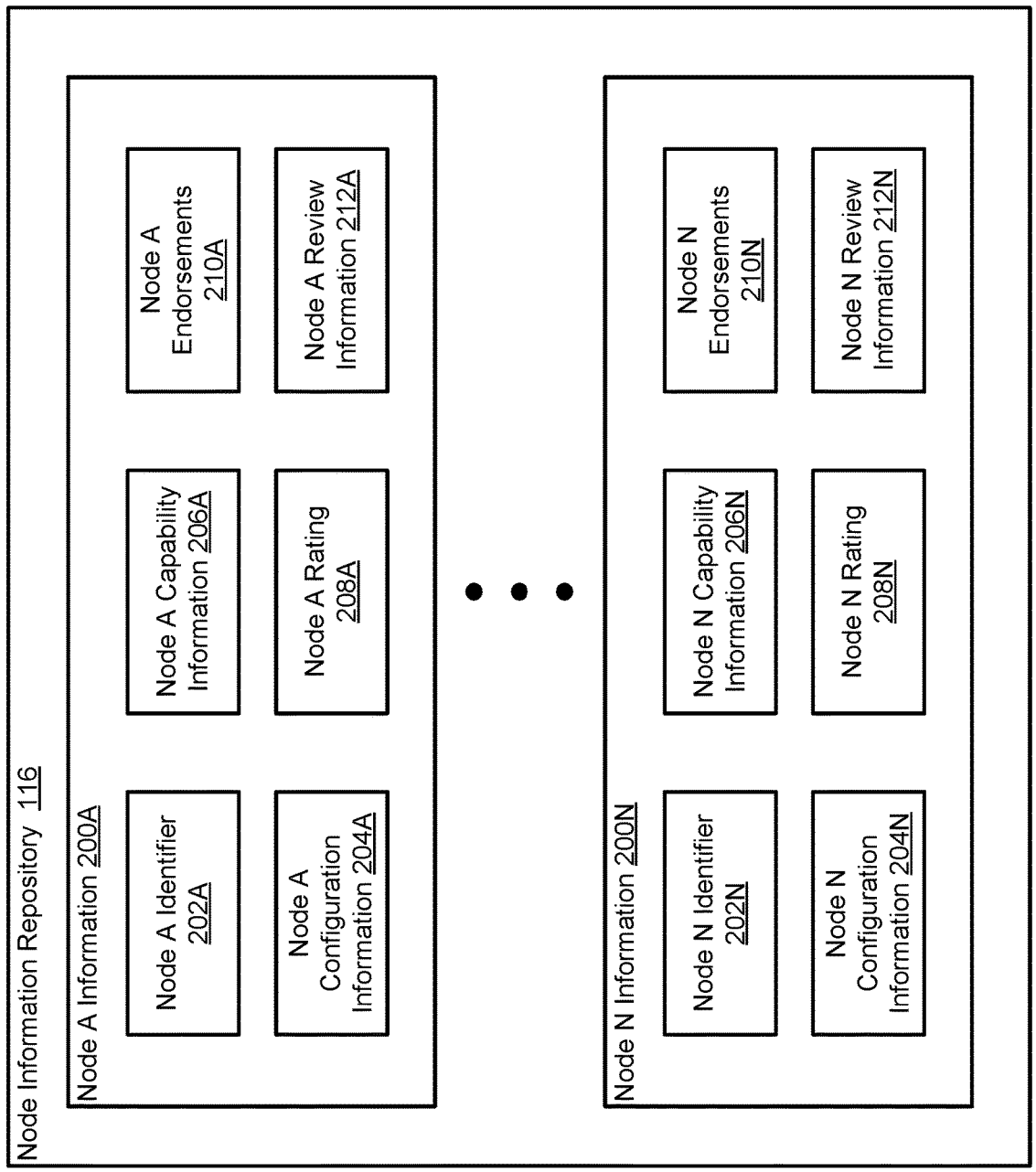
FIG. 2 shows a diagram of a node information repository in accordance with one or more embodiments of the invention.

FIG. 2 shows a diagram of a node information repository in accordance with one or more embodiments of the invention. The node information repository (116) may be an embodiment of the node information repository (116, FIG. 1B) discussed above. As discussed above, the node information repository (116) may include information regarding the registered nodes (100, FIG. 1A) included in the system. The node information repository (116) may include node information associated with each node of the nodes (100, FIG. 1A). The node information repository (116) may include node A information (200A) associated with node A (100A, FIG. 1A) and node N information (200N) associated with node N (100N, FIG. 1A). The node information repository may include other and/or additional information without departing from the invention. Node A information (200A) may include a node A identifier (202A), node A configuration information (204A), node A capability information (206A), a node A rating (208A), node A endorsements (210A), and node A review information (212A). Node A information (200A) may include other and/or additional information associated with node A (100A, FIG. 1A) without departing from the invention. Node N information (200N) may include a node N identifier (202N), node N configuration information (204N), node N capability information (206N), a node N rating (208N), node N endorsements (210N), and node N review information (212N). Node N information (200N) may include other and/or additional information associated with node N (100N, FIG. 1A) without departing from the invention. Each of the components of node A information (200A) and node N information (200N) is discussed below.

Node identifiers (e.g., 202A, 202N) may include global, unique bit strings generated by the node and/or the social manager (110) when nodes register with the social manager (110) that may be used to specify particular nodes (e.g., 100A, FIG. 1A) from other nodes (e.g., 100N, FIG. 1A). The node identifiers (e.g., 202A, 202N) may include any authentication information that may be used by the social manager (110, FIG. 1A) to verify the identity of nodes (100). The node identifiers (e.g., 202A, 202N) may include other and/or additional information that may be used to identify and verify the identity of nodes (100, FIG. 1A).

Node configuration information (e.g., 204A, 204N) may include information that specifies the components (i.e., service provider(s) (104, FIG. 1C)) included in nodes (100, FIG. 1A) that are able to perform services and/or portions of services. The node configuration information (e.g., 204A, 204N) may specify the types of components and the quantity of each types of components included in the nodes (100, FIG. 1A). The types of components may include, for example, processors (e.g., components that include integrated circuitry), memory (e.g., random access memory (RAM)), input and output device(s), non-volatile storage hardware (e.g., solid-state drives (SSDs), hard disk drives (HDDs)), one or more physical interfaces (e.g., network ports, storage ports), any number of other hardware components (not shown), accelerators (e.g., GPUs), sensors for obtaining data, and/or any combination thereof. The node configuration information (e.g., 204A, 204N) may be generated by the node associated with the node configuration information (e.g., 204A, 204N) and provided to the social manager (110, FIG. 1A) when nodes (100, FIG. 1A) register with the social manager (110, FIG. 1A). The node configuration information (e.g., 204A, 204N) may include other and/or additional information associated with the resources and/or components included in the nodes (100, FIG. 1A).

Node capability information (e.g., 206A, 206N) may include information that specifies the services and/or portions of services that nodes (100, FIG. 1A) include the capability to provide. The node capability information (e.g., 206A, 206N) may specify, for example, types of data that nodes have access to, applications hosted by the nodes, and or any other services and/or portions of services that nodes may be able to provide. The node capability information (e.g., 206A, 206N) may be generated by the node associated with the node capability information (e.g., 206A, 206N) and provided to the social manager (110, FIG. 1A) when nodes (100, FIG. 1A) register with the social manager (110, FIG. 1A). The node capability information (e.g., 206A, 206N) may include other and/or additional information that may specify the services and/or portions of services that the nodes (100, FIG. 1A) may be able to provide without departing from the invention.

Node ratings (e.g., 208A, 208N) may be numerical representations of the satisfaction of other nodes with the nodes associated with the node ratings (e.g., 208A, 208N) based on services and/or portions of services obtained from the node associated with the node ratings (e.g., 208A, 208N). The node ratings (e.g., 208A, 208N) may be an average of all generated node ratings (e.g., 208A, 208N) associated with the nodes (100, FIG. 1A). The higher a node rating, the more satisfied a node is with the performance of the of the service and/or portion of the service by the node associated with the node rating. The node ratings (e.g., 208A, 208N) may be generated by the nodes that obtain services from the nodes associated with the node ratings (e.g., 208A, 208N). The node ratings (e.g., 208A, 208N) may be generated when nodes perform services using another node. The node ratings (e.g., 208A, 208N) may be provided to the social manager (110, FIG. 1A), which may update the node ratings of the node associated with the node ratings. The node ratings (e.g., 208A, 208N) may be used by nodes to identify other nodes to perform services and/or portions of services. Nodes (100, FIG. 1A) may select a node with a higher node rating (e.g., 208A) before selecting the node with the lower rating (e.g., 208N). The node ratings (e.g., 208A, 208N) may include other and/or additional information associated with the satisfaction of other nodes of performances of services by the nodes without departing from the invention.

Node endorsements (e.g., 210A, 210N) may include node identifiers of nodes that would use the nodes associated with the node endorsements (e.g., 210A, 210N) to perform future services and/or portions of services. The node endorsements (e.g., 210A, 210N) may be used by nodes (100, FIG. 1A) to identify other nodes to perform services and/or portions of services. A node may select another node that is associated with a larger quantity of endorsements, or is endorsed by the node, before selecting a node with few or no endorsements, or is not endorsed by the node. The node endorsements (e.g., 210A, 210N) may be generated when nodes (100, FIG. 1A) perform services using another node. The node endorsements (e.g., 210A, 210N) may be provided to the social manager (110, FIG. 1A), which may update the node endorsements (e.g., 210A, 210N) of the node associated with the node endorsements (e.g., 210A, 210N). The node endorsements may include other and/or additional information associated with the nodes (100, FIG. 1A) without departing from the invention.

Node review information (e.g., 212A, 212N) may include information associated with the performance of services by the nodes associated with the node review information (e.g., 212A, 212N). The node review information (e.g., 212A, 212N) may specify the services performed by the nodes, a date and time associated with the performance of the services, descriptions of the services, the results of the performances, and other and/or additional information associated with the performances of services and/or portions of services without departing from the invention. Node review information (e.g., 212A, 212N) may be generated when nodes (100, FIG. 1A) perform services using another node. The node review information (e.g., 212A, 212N) may be provided to the social manager (110, FIG. 1A), which may update the node review information (e.g., 212A, 212N) of the node associated with the node review information (e.g., 212A, 212N).

Figure 3A:
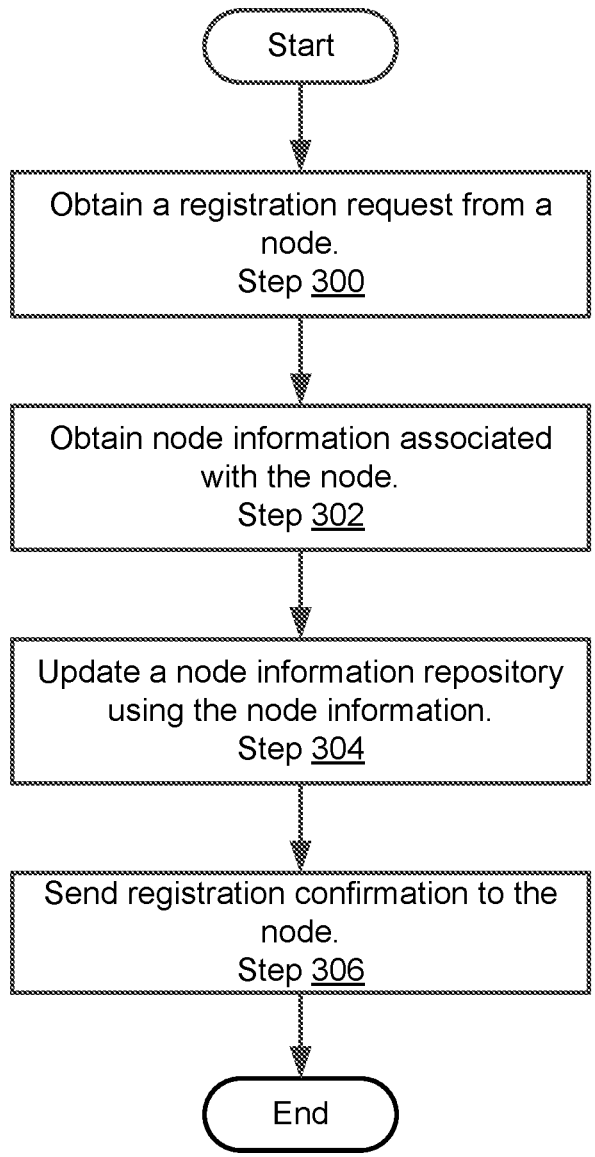
FIG. 3A shows a flowchart of a method registering a node in accordance with one or more embodiments of the invention.

FIG. 3A shows a flowchart of a method registering a node in accordance with one or more embodiments of the invention. The method may be performed by, for example, a social manager controller (112, FIG. 1B) of a social manager (110, FIG. 1A). Other components of the system illustrated in FIG. 1A may perform all, or a portion of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a registration request is obtained from a node.

In one or more embodiments of the invention, the social manager controller of the social manager obtains a message from a node. The message may include a request to register with the social manager. The message may include a node identifier associated with the node. The request may include other and/or additional information that the social manager controller may use to communicate with the node. The registration request may be obtained from the node via other and/or additional methods without departing from the invention.

In step 302, node information associated with the node is obtained.

In one or more embodiments of the invention, in response to the request obtained in step 300, the social manager controller of the social manager may send a message to the node. The message may include a request for node information associated with the node. In response to obtaining the message from the social manager, the node may generate and/or otherwise obtain the node information associated with the node. The node may send a message that includes the node information associated with the node to the social manager. The node information may include initial node information. The initial node information may include the node identifier, node configuration information, and node capability information associated with the node. The node information associated with the node may be obtained via other and/or additional methods without departing from the invention.

In step 304, the node information repository is updated using the node information.

In one or more embodiments of the invention, the social manager controller updates the node information repository to include node information associated with the node. The node information may include the node identifier, node configuration information, and node capability information associated with the node. The social manager controller may generate authentication information (e.g., public and private keys using PKI) using any method of authenticating or verifying the identity of the node without departing from the invention. The social manager controller may include the authentication information in the data node identifier of the node information associated with the node in the node information repository. The node information repository may be updated using the node information via other and/or additional methods without departing from the invention.

In step 306, registration confirmation is sent to the node.

In one or more embodiments of the invention, the social manager controller sends a message to the node. The message may include a notification that confirms the node has successfully registered with the social manager. The message may include any portion of the authentication information generated by the social manager controller that the node may use to verify the node's identity during communication with the social manager. As a result, the node may obtain social management services from the social manager. The registration confirmation may be sent to the node via other and/or additional methods without departing from the invention.

The method may end following step 306.

Figure 3B:
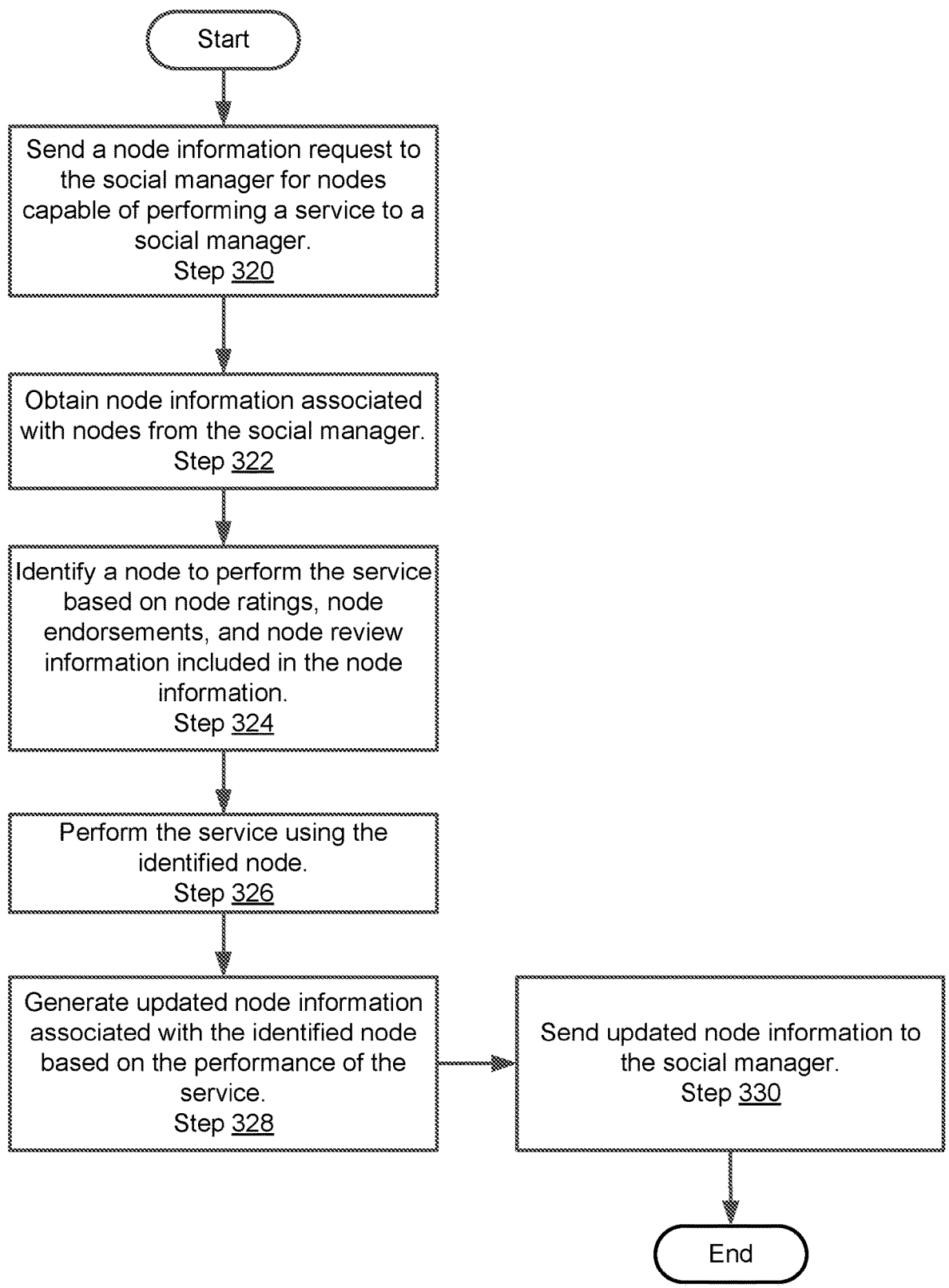
FIG. 3B shows a flowchart of a method for performing a service in accordance with one or more embodiments of the invention.

FIG. 3B shows a flowchart of a method for performing a service in accordance with one or more embodiments of the invention. The method may be performed by, for example, a social agent (102, FIG. 1C) of a node (e.g., 100A, FIG. 1A). Other components of the system illustrated in FIG. 1A may perform all, or a portion of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, a node information request for nodes capable of performing a service is sent to the social manager.

In one or more embodiments of the invention, the social agent of the node is requested by a user of the node to perform a service that the node is unable to perform. The social agent may therefore, send a message to the social manager. The message may include a request for node information associated with nodes in the system that include the capability to perform the service. The message may specify the service. The request may include other and/or additional information that the social manager controller may use to communicate with the node. The node information request for nodes capable of performing a service may be sent to the social manager via other and/or additional methods without departing from the invention.

In step 322, node information associated with nodes is obtained from the social manager.

In one or more embodiments of the invention, in response to obtaining the node information request in step 320, the social manager sends a message to the node that includes node information associated with all registered nodes that are registered with the social manager. The manager may identify all nodes that correspond with node information included in the node information repository that include node capability information that indicates the associated nodes are capable of performing the service specified by the request obtained in step 320. The social manager may send a message that includes the node information associated with all the nodes identified by the social manager to the node. Node information associated with the nodes may be obtained via other and/or additional methods without departing from the invention.

In step 324, a node to perform the service is identified based on node ratings, node endorsements, and node review information included in the node information.

In one or more embodiments of the invention, the social agent of the node compares the node information associated with each node that is capable of performing the service to identify the node to perform the service. More specifically, the social agent of the node compares the node ratings, the node endorsements, and the node review information associated with the nodes specified by the node information to identify a node that includes the highest node rating, the most endorsements, and/or the most node review information associated with successful performances of services that indicates that the node is the most trustworthy and/or the most capable of the nodes with the capability to perform the service. The social agent may identify the node associated with the highest node rating, the most endorsements, and/or the most node review information associated with successful performances of services as the node to perform the service. The node to perform the service may be identified based on node ratings, node endorsements, and node review information included in the node information via other and/or additional methods without departing from the invention.

In step 326, the service is performed using the identified node.

In one or more embodiments of the invention, the social agent of the node uses the node information associated with the identified data node to send a message to the identified data node. The message may include a request to perform the service, any requirements associated with the performance (e.g., time requirements), and any data associated with the performance of the service. After obtaining the message, the identified data node performs the service and provides the service result to the social agent of the node. The social agent of the node may monitor the performance of the service to track the amount of time required to perform the service, whether service requirements (e.g., performed in an appropriate amount of time) were met, and whether an expected result (e.g., appropriate data) was obtained. The service may be performed using the identified node via other and/or additional methods without departing from the invention.

In step 328, updated node information associated with the performance of the service is generated.

In one or more embodiments of the invention, the social agent of the node generates updated node information associated with the identified node based on the performance of the service. The social agent may generate node review information that may include a description of the service performed by the identified node, a node rating based on the satisfaction of the social agent of the node with the performance of the service by the identified node (e.g., was the service performed correctly, were requirements met, etc.), and/or a node endorsement associated with the identified node.

In step 330, the updated node information is sent to the social manager.

In one or more embodiments of the invention, the social agent of the node sends a message to the social manager. The message may include the updated node information associated with the identified data node that performed the service. In response to obtaining the message, the social manager may update the node information associated with the identified node that performed the service to include the updated node information. The node rating included in the updated node information may be applied to the node rating associated with the identified node included in the node information repository, the node endorsement included in the updated node information may be included in the node endorsements associated with the identified node included in the node information repository, and the node review information included in the updated node information may be included in the node review information associated with the identified node included in the node information repository.

The updated node information may be sent to the social manager via other and/or additional methods without departing from the invention.

The method may end following step 330.

Figure 4A:
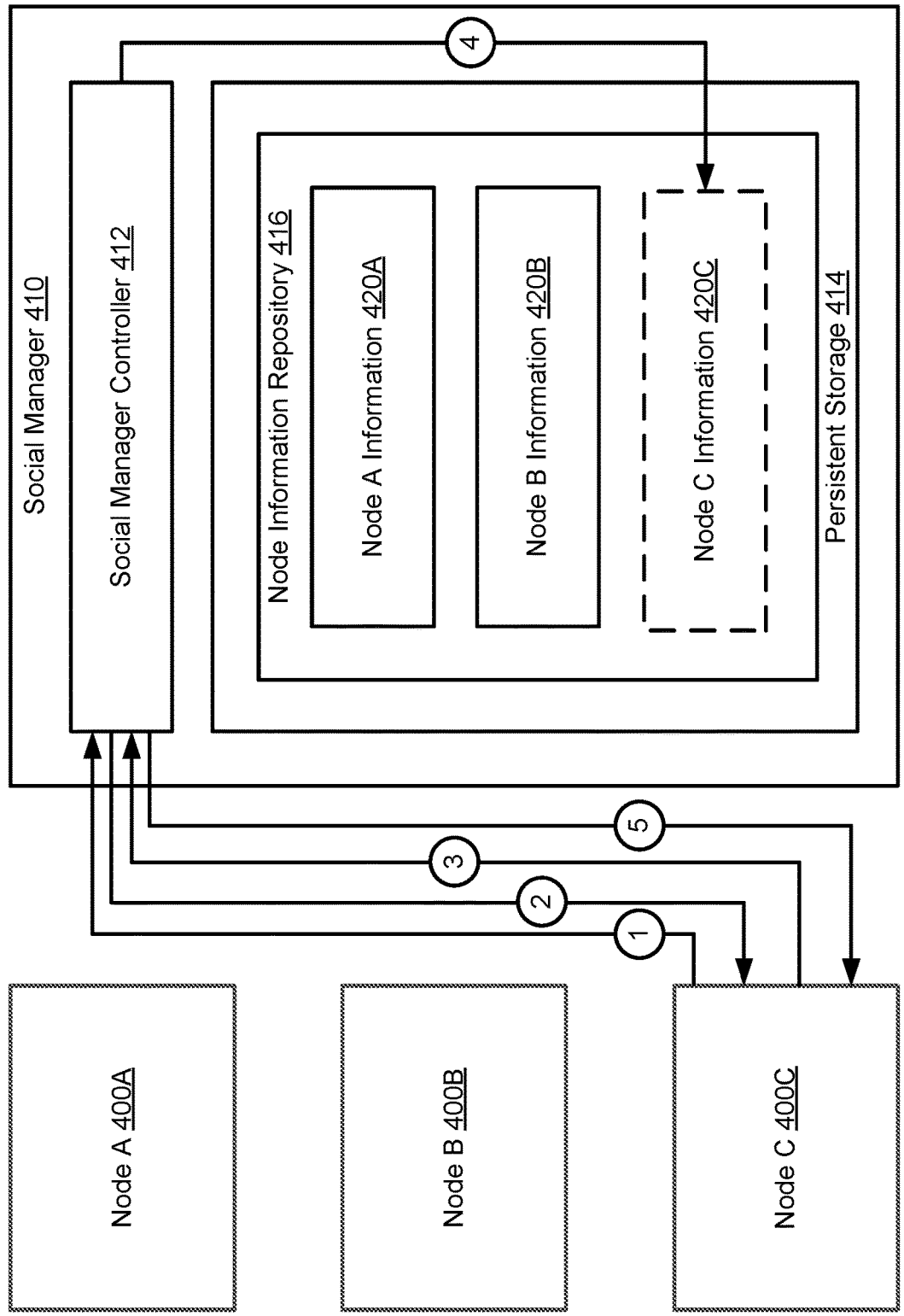
FIGS. 4A-4B show diagrams of the operation of an example system over time in accordance with one or more embodiments of the invention.
Figure 4B:
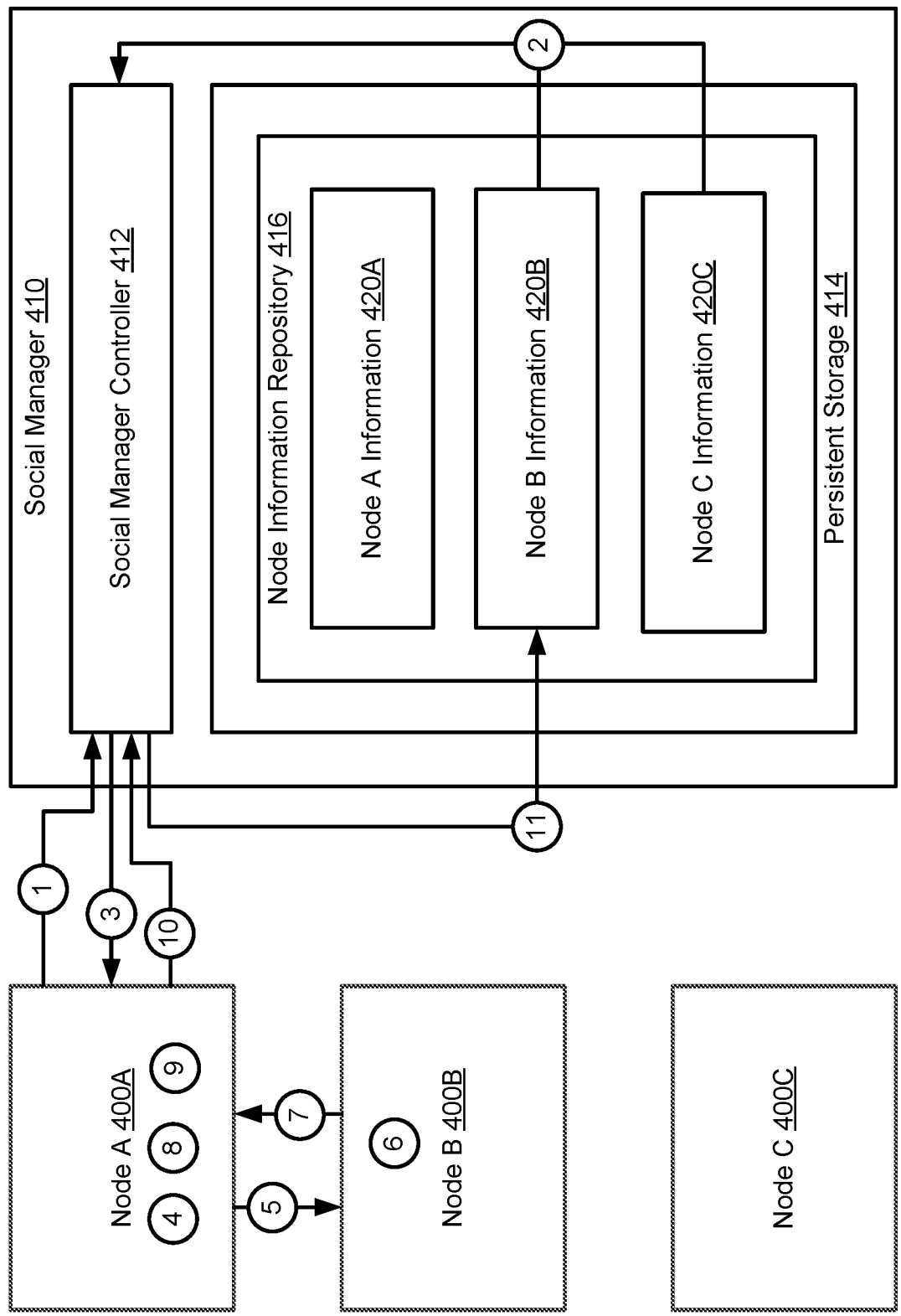

To further clarify embodiments of the invention, non-limiting examples are provided in FIGS. 4A-4B. FIGS. 4A-4B show diagrams of operations performed by an example system over time in accordance with one or more embodiments of the invention. FIGS. 4A-4B may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIGS. 4A-4B.

Example

Turning to FIG. 4A, consider a scenario in which a node included in a system registers with a social manager. The system includes a social manager (410) and three nodes, node A (400A), node B (400B), and node C (400B). The social manager (410) includes a social manager controller (412) and persistent storage (414). The persistent storage includes a node information repository (416). Node A (400A) and Node B (400B) have registered with the social manager (410), and therefore, at the point in time at the start of the example, the node information repository (416) includes node A information (420A) and node B information (420B).

At step 1, node C (400C) sends a message to the social manager controller (412). The message includes a request to register with the social manager (410). In response to obtaining the registration request, the social manager controller, at step 2, sends a message to node C (400C). The message includes a request for node information associated with node C (400C). In response to the message, at step 3, node C (400C) generates and sends node C information (420C) associated with node C (400C) to the social manager controller (412). The node C information (420C) includes a node identifier associated with node C (400C), node configuration information associated with node C (400C), and node capability information associated with node C (400C).

After obtaining node C information (420C) from node C (400C), at step 4, the social manager controller (412) updates the node information repository (416) so that the node information repository includes node C information (420C). At step 5, the social manager controller (412) sends registration confirmation to node C (400C). As a result, node C (400C) is able to use the social manager (410) to identify other nodes (e.g., 400B, 400A) to perform services based on nodes' associated trustworthiness indicated by the node information (e.g., 420A, 420B) included in the node information repository (416).

Turning to FIG. 4B, consider a scenario in which a node performs a service using another node in the system. The system includes a social manager (410) and three nodes, node A (400A), node B (400B), and node C (400B). The social manager (410) includes a social manager controller (412) and persistent storage (414). The persistent storage includes a node information repository (416). Node A (400A), node B (400B), and node C (400C) have registered with the social manager (410), and therefore, at the point in time at the start of the example, the node information repository (416) includes node A information (420A), node B information (420B), and node C information (420C).

At step 1, node A (400A) sends a message to the social manager controller (412) which includes a request to obtain the location of a nearest gas station. Node A (400A) does not include the capability to perform that service. Therefore, the message sent in step 1 includes a request to obtain node information associated with a node that includes the capability of identifying the location of the nearest gas station and provide the location to node A (400A). In response to obtaining the message, at step 2, the social manager controller (412) identifies that node B information (420B) and node C information (420C) include node capability information that indicate that node B (400B) and node C (400C) both include the functionality to provide the location of the nearest gas station to node A (400A). At step 3, the social manager controller (412) sends node B information (420B) and node C information (420C) to node A (400A). After obtaining node B information (420B) and node C information (420C), at step 4, node A (400A) compares node B information (420B) and node C information (420C) and identifies that node B information (420B) is associated with a higher node rating and more node endorsements than node C information (420C). Therefore, node A (400A) identifies node B (400B) to perform the service. At step 5, node A sends a request to obtain the nearest gas station to node A (400A) and provides the location of node A (400A). At step 6, node B (400B) identifies the nearest gas station to node A (400A), and, at step 7, provides the location of the nearest gas station to node A (400A). Node A (400A) goes to the location provided by node B (400B) and, at step 8, determines that the location is in fact a gas station and was within an appropriate distance from node A (400A). Based on the determination, at step 9, node A (400A) generates updated node information associated with node B (400B) that includes a high node rating, an endorsement, and a node review information that includes a description of the service performed by node B (400B). At step 10, node A (400A) sends the updated node information to the social manger controller (412). After obtaining the updated node information, the social manager controller (412), at step 11, updates node B information (420B) to include the updated node information generated by node A (400A).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to establishing trust between nodes based on node information. A node may require another node to perform a service. A node may obtain node information associated with multiple nodes that include the capability to perform the service. The node may identify the most trustworthy node to perform the service based on node ratings, node endorsements, and node review information generated by other nodes that have previously obtained services from the multiple nodes that include the capability to perform the service. The node may identify the node of the multiple nodes associated with the highest node rating, the most node endorsements, and the node review information that indicates the most successfully performed services. As a result the node may use the node information automatically generated by other nodes to identify the most trustworthy node to perform the service. Therefore, the efficiency of determining the trustworthiness of other nodes and selecting the most trustworthy nodes in a system may be improved.

Thus, embodiments of the invention may address the problem of inefficient use of computing resources to identify reliable nodes to perform services. This problem arises due to the technological nature of the environment in which the nodes operate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing nodes, the method comprising:
sending, by a first node of a plurality of nodes, a node information request to a social manager, wherein the node information request specifies a portion of a computer implemented service to be provided to the first node by a second node;
obtaining node information associated with a portion of the plurality of nodes from the social manager, wherein:
the portion of the plurality of nodes previously expressed node capability information and node configuration information associated with the portion of the computer implemented service;
the node capability information specifies the portion of the computer implemented service and types of data the portion of the plurality of nodes has access to; and
the node configuration information specifies quantities and types of components associated with the portion of the computer implemented service, wherein the types of components comprising accelerators and sensors;
identifying the second node of the portion of the plurality of nodes based on the node
information to perform the portion of the computer implemented service, wherein:
the node information comprises a first rating, first endorsements, and first review information associated with performances of previous computer implemented services by the second node; and
the first rating, the first endorsements, and the first review information are generated by the plurality of nodes;
performing the computer implemented service using the second node, wherein:
the second node performs the portion of the computer implemented service;
generating, by the first node, updated node information associated with the second node,
wherein generating updated node information comprises generating a second rating, a second endorsement, and second review information based on the performance of the portion of the computer implemented service by the second node; and
sending the updated node information to the social manager.

2. The method of claim 1, wherein the node information comprises:
ratings, wherein the ratings comprise the first rating;
endorsements, wherein the endorsements comprise the first endorsements; and
review information, wherein the review information comprises the first review information.

3. The method of claim 2, wherein identifying the second node of the portion of the plurality of nodes based on the node information to perform the portion of the computer implemented service comprises:
comparing the node information associated with the second node with the node information associated with other nodes of the portion of the plurality of nodes; and
identifying the second node based on the comparison, wherein the first rating is a highest rating of the ratings, the first endorsements include a highest amount of endorsements of the endorsements, or the first review information is associated with a fewest amount of negative service performances among the review information.

4. The method of claim 1, wherein the node information is generated, at least in part, by the plurality of nodes.

5. The method of claim 1, further comprising:
prior to sending the node information request to the social manager:
obtaining, by the social manager, a registration request from the second node;
obtaining initial node information associated with the second node;
updating a node information repository using the initial node information;
and sending registration confirmation to the second node.

6. The method of claim 5, wherein the initial node information comprises:
a node identifier associated with the second node,
node capability information associated with the second node, and
node configuration information associated with the second node.

7. A system for managing nodes, the system comprising:
a first processor; and
a second processor executing as a first node of a plurality of nodes, wherein the first node is programmed to:
send a node information request to the first processor, wherein the node information request specifies a portion of a computer implemented service to be provided to the first node by a second node;
obtain node information associated with a portion of the plurality of nodes from the first processor, wherein:
the portion of the plurality of nodes previously expressed node capability information and node configuration information associated with the portion of the computer implemented service;
the node capability information specifies the portion of the computer implemented service and types of data the portion of the plurality of nodes has access to; and
the node configuration information specifies quantities and types of components associated with the portion of the computer implemented service, wherein the types of components comprising accelerators and sensors;
identify the second node of the portion of the plurality of nodes based on the node information to perform the portion of the computer implemented service, wherein:
the node information comprises a first rating, first endorsements, and first review information associated with performances of previous computer implemented services by the second node; and
the first rating, the first endorsements, and the first review information are generated by the plurality of nodes;
perform the computer implemented service using the second node, wherein:
the second node performs the portion of the computer implemented service;
generate, by the first node, updated node information associated with the second node, wherein generating updated node information comprises generating a second rating, a second endorsement, and second review information based on the performance of the portion of the computer implemented service by the second node; and
send the updated node information to the social manager.

8. The system of claim 7, wherein the node information comprises:
ratings, wherein the ratings comprise the first rating;
endorsements, wherein the endorsements comprise the first endorsements; and
review information, wherein the review information comprises the first review information.

9. The system of claim 8, wherein identifying the second node of the portion of the plurality of nodes based on the node information to perform the portion of the computer implemented service comprises:
comparing the node information associated with the second node with the node information associated with other nodes of the portion of the plurality of nodes; and
identifying the second node based on the comparison, wherein the first rating is a highest rating of the ratings, the first endorsements include a highest amount of endorsements of the endorsements, or the first review information is associated with a fewest amount of negative service performances among the review information.

10. The system of claim 7, wherein the node information is generated, at least in part, by the plurality of nodes.

11. The system of claim 7, wherein the first processor is programmed to:
prior to sending the node information request to the first processor:
obtain a registration request from the second node;
obtain initial node information associated with the second node;
update a node information repository using the initial node information; and
send registration confirmation to the second node.

12. The system of claim 11, wherein the initial node information comprises:
a node identifier associated with the second node,
node capability information associated with the second node, and
node configuration information associated with the second node.

13. A non-transitory computer readable medium comprising computer readable program code, which when executed by a computer processor enables the computer processor to perform a method for managing nodes, the method comprising:
sending, by a first node of a plurality of nodes, a node information request to a social manager, wherein the node information request specifies a portion of a computer implemented service to be provided to the first node by a second node;
obtaining node information associated with a portion of the plurality of nodes from the social manager, wherein:
the portion of the plurality of nodes previously expressed node capability information and node configuration information associated with the portion of the computer implemented service;
the node capability information specifies the portion of the computer implemented service and types of data the portion of the plurality of nodes has access to; and
the node configuration information specifies quantities and types of components associated with the portion of the computer implemented service, wherein the types of components comprising accelerators and sensors;

identifying the second node of the portion of the plurality of nodes based on the node
information to perform the portion of the computer implemented service, wherein:
- the node information comprises a first rating, first endorsements, and first review information associated with performances of previous computer implemented services by the second node; and
- the first rating, the first endorsements, and the first review information are generated by the plurality of nodes;

performing the computer implemented service using the second node, wherein:
- the second node performs the portion of the computer implemented service;

generating, by the first node, updated node information associated with the second node, wherein generating updated node information comprises generating a second rating, a second endorsement, and second review information based on the performance of the portion of the computer implemented service by the second node; and sending the updated node information to the social manager.

14. The non-transitory computer readable medium of claim 13, wherein the node information comprises:
- ratings, wherein the ratings comprise the first rating;
- endorsements, wherein the endorsements comprise the first endorsements; and
- review information, wherein the review information comprises the first review information.

\* \* \* \* \*